United States Patent [19]
Porter et al.

[11] Patent Number: 5,939,036
[45] Date of Patent: Aug. 17, 1999

[54] MANUFACTURE OF PRECIPITATED CALCIUM CARBONATE

[75] Inventors: Alvin Lee Porter; William Joseph Wilson, both of Saint John, Canada

[73] Assignee: Goldcorp Inc., Toronto, Canada

[21] Appl. No.: 09/062,006

[22] Filed: Apr. 17, 1998

[30]   Foreign Application Priority Data

Apr. 21, 1997 [CA]   Canada ..................................... 2203210

[51] Int. Cl.[6] .................................................... C01F 11/18
[52] U.S. Cl. ........................... 423/165; 423/431; 423/432
[58] Field of Search ..................... 423/432, 431, 423/165

[56]           References Cited

U.S. PATENT DOCUMENTS

| | | | |
|---|---|---|---|
| 3,347,624 | 10/1967 | Taylor | 423/432 |
| 5,232,678 | 8/1993 | Bleakley et al. | 423/432 |
| 5,558,850 | 9/1996 | Bleakley et al. | 423/432 |

FOREIGN PATENT DOCUMENTS

| | | | |
|---|---|---|---|
| 64-72916 | 3/1989 | Japan | 423/432 |
| 1-301511 | 12/1989 | Japan | 423/432 |

*Primary Examiner*—Wayne Langel
*Attorney, Agent, or Firm*—Ohlandt, Greeley, Ruggiero & Perle

[57]           ABSTRACT

A method for the manufacture of precipitated calcium carbonate from impure calcium oxide of improved colour is disclosed. The method comprises admixing impure calcium oxide with an aqueous solution consisting essentially of a salt of at least one compound selected from the group consisting of organic amines of the formula $RNH_2$ and alkanolamines of the formula $NH_2(R^1OH)$, where R and $R^1$ are alkyl groups of 1–4 carbon atoms, and hydrochloric or nitric acid. The solution obtained is separated from insoluble matter and then treated with carbon dioxide or the carbonate of the amine or alkanolamine. Preferably, the amine of the salt and of the carbonate are the same, and the salt is used in at least the stoichiometric amount to dissolve the lime.

7 Claims, No Drawings

MANUFACTURE OF PRECIPITATED CALCIUM CARBONATE

FIELD OF THE INVENTION

The present invention relates to a method for the manufacture of precipitated calcium carbonate (PCC), and especially to a method for the manufacture of precipitated calcium carbonate from lime. In particular, the method provides a precipitated calcium carbonate with a high brightness.

BACKGROUND OF THE INVENTION

Precipitated calcium carbonate is used in a wide variety of end uses. In some end uses, the brightness of the precipitated calcium carbonate is of minor importance. However, in a number of end uses e.g. use of precipitated calcium carbonate as a filler, as a coating agent or as a pigment, it is important or critical that the precipitated calcium carbonate have a high degree of brightness. As used herein, brightness of calcium carbonate is measured by the method of TAPPI T646 om-94. Use of precipitated calcium carbonate as a filler, coating agent or pigment frequently requires that the brightness be not less than 95%.

A number of techniques may be used to obtain precipitated calcium carbonate. A typical method involves forming a suspension of lime in water, converting the lime into calcium hydroxide, and treating the resultant suspension of calcium hydroxide with carbon dioxide so as to form calcium carbonate. Such treatment leaves grit, colored material and other insoluble matter in the suspension, which contaminates the resulting PCC that is formed. Thus, in order to obtain PCC with acceptable properties, the lime used in the process must be of a high purity.

Other techniques are disclosed in the following patents. Canadian Patent 441 583 of W. P. Foster discloses carbonation of lime suspensions in the presence of 0.125% by weight of ammonia or amines, optionally using ammonia or amines in the form of one of its compounds, such as chloride or stearate, as such compounds react with a small part of the lime to liberate ammonia or amine.

Canadian Patent 352 149 of W. H. MacIntire discloses a process for forming a double precipitate of calcium and magnesium carbonate by adding ammonia gas to a suspension of dolomite and then mixing with carbon dioxide.

Canadian Patent 2 066 655 relates to a process of preparing calcium carbonate in which a reagent that is a polybasic acid, a protein or an amine is added to an aqueous suspension of slaked quick lime, and calcium carbonate is precipitated with carbon dioxide. The amount of the reagent is preferably 0.01 to 15% based on the weight of dry calcium oxide.

Canadian Patent 2 090 088 discloses a method of producing relatively pure calcium carbonate from an impure source of calcium oxide in which a slurry of aqueous hydrated lime is treated with a water-soluble source of anions that are capable of forming a salt with calcium ions that has a dissociation constant greater than the dissociation constant of calcium oxide, for example ammonium nitrate or ammonium chloride.

U.S. Pat. No. 3,347,624 discloses a process for the manufacture of calcium carbonate in which 0.001 to 0.1 grams, per gram of calcium oxide, of a water soluble of diamine is added to an aqueous suspension of calcium oxide and then carbonated with carbon dioxide.

U.S. Pat. No. 5,871,519 relates to a process for producing magnesium oxide and/or hydrates thereof from predominately magnesium or magnesium-calcium raw materials in which calcium oxide is dissolved from the mixture using an aqueous solution containing an organic amine and a salt formed from an organic amine and an acid capable of forming a soluble calcium salt with the organic amine.

U.S. Pat. No. 5,232,678 relates to the preparation of calcium carbonate in which 0.01 to 15% by weight of an amine is added to the suspension of the quick lime.

If an ammonium salt e.g. ammonium nitrate, is used to dissolve or complex the lime into solution, and if carbon dioxide and air is used in order to precipitate the calcium carbonate, then a significant part of the cost of the process is the capital and operating cost of the scrubbing of ammonia from the exit gas, which is a mixture of ammonia, carbon dioxide and air.

SUMMARY OF THE INVENTION

A method for the manufacture of precipitated calcium carbonate that does not involve the use of ammonia, and its consequent recovery problems, and which may be operated efficiently and cost effectively is required.

A method for the manufacture of precipitated calcium carbonate of improved brightness has now been found.

Accordingly, the present invention provides for a method for the manufacture of precipitated calcium carbonate from impure calcium oxide, comprising:

(a) admixing said impure calcium oxide with an aqueous solution consisting essentially of a salt of at least one compound selected from the group consisting of organic amines of the formula $RNH_2$ and alkanolamines of the formula $NH_2(R^1OH)$, where R and $R^1$ are alkyl groups of 1–4 carbon atoms, and hydrochloric or nitric acid;

(b) separating the solution so obtained from insoluble matter therein; and (c) treating the solution with (i) carbon dioxide or (ii) the carbonate of said amine or alkanolamine of step (a).

In a preferred embodiment of the method of the present invention, the salt is added in step (i) in at least the stoichiometric amount to dissolve the lime.

In another embodiment, the method of the present invention provides precipitated calcium carbonate having a brightness of at least 95%, and especially at least 97%.

DETAILED DESCRIPTION OF THE INVENTION

The method of the present invention relates to the manufacture of precipitated calcium carbonate from impure lime. Sources of impure lime are known and may be obtained from the calcination of limestone in an industrial kiln. Sources of limestone suitable for a calcination process are known to persons skilled in the art. It is understood that the limestone would be contaminated with magnesium carbonate and that other materials may also be present, some of which might be colored. Examples of the latter could include iron oxide, manganese oxide, iron carbonate, manganese carbonate, sand and other silicates. Calcination of the limestone may be carried out at temperatures in the range of from about 950° C. to about 1100° C., especially in the range of from about 950° C. to about 1050° C. Magnesium is not solubilized in the process of the present invention if the temperature of calcination is above 900° C. Nonetheless, it is understood that any suitable source of lime may be used for the process.

The lime is slaked by admixing with a reagent solution in an aqueous solution in which the calcium will dissolve. The reagent solution is an aqueous solution of a salt of at least one compound selected from the group consisting of organic amines of the formula $RNH_2$ and alkanolamines of the formula $NH_2(R^1OH)$, where R and $R^1$ are alkyl groups of 1–4 carbon atoms. Such amines are primary amines and the alkanolamines only have one —OH moiety. The preferred alkyl groups are methyl and ethyl. The organic amine is in the form of a salt with hydrochloric acid or nitric acid.

The resultant solution is filtered so as to remove impurities such as grit and other contaminants that have not dissolved in the solution. The filtered solution is then reacted in one of two ways viz a) with carbon dioxide or b) with an amine carbonate. The use of an amine carbonate is preferred. In particularly preferred embodiments, the amine of the amine carbonate is the same as the amine in the aqueous solution used to solubilize the lime. This results in precipitation of calcium carbonate which, after filtration, leaves a mother liquor that is suitable for reuse. The precipitated calcium carbonate that is filtered from the solution is washed, to purify the calcium carbonate and wash off amine for recycling to the process. In preferred embodiments of the method, the calcium carbonate that is obtained is in the range of 97+% purity.

The product obtained has a high brightness, as measured by the method of TAPPI T646 om-94. In preferred embodiments, the PCC has a brightness of at least 97%. In addition, the PCC obtained from the process is essentially free of grit and insolubles, in contrast to the conventional method of preparing PCC, and is therefore believed to be a PCC of high quality. The absence of grit means that the product can be used without being abrasive to calendering rolls in paper making processes.

It has also been found that under the conditions of preparation, only traces of magnesium carbonate are found in the resulting product, primarily because the magnesium tends not to dissolve in the slaking process and therefore is filtered out prior to carbonation.

The PCC obtained by the process of the present invention may be prepared in a variety of crystalline forms, depending on the temperature of crystallization, as is well known in the art. For example, at 10 to 15° C., the product is obtained as rhombohedral crystals, while at 35 to 40° C. vaterite crystals are obtained. This metastable form of calcium carbonate may be converted to aragonite crystals, which are obtained in the form of needles, by heating to about 95° C.

While processing with $CO_2$ in general tends to give coarse crystals, i.e. greater than 1 micron in size, mixing of solutions of ethanolamine carbonate with the reaction mixture can give gelatinous products which with stirring causes crystals to grow. After a period of time, which in embodiments and depending on the particular solution might be about 30 minutes, the crystals grow to an appropriate size, e.g. in the range of where the majority of the crystals are less than 1 micron.

Thus by varying the reaction conditions, temperatures and concentrations, it is possible to obtain PCC products in a wide range of particle sizes. This provides versatility to the process and extends the potential application of the invention.

The present invention is illustrated by the following examples.

EXAMPLE I

Ethanolamine chloride was prepared by mixing one mole of ethanolamine with one mole of concentrated hydrochloric acid. The solution was then diluted with water to give a mixture containing one mole of ethanolamine, one mole of hydrochloric acid and 18 moles of water.

The resultant solution was reacted with lime that had been prepared in a commercial operation at Havelock Lime, Havelock, N.B. Canada, being calcined at about 1050° C. Such lime normally contains about 1% magnesium.

The solution obtained contained 0.5 mole of calcium oxide per mole of ethanolamine chloride. It was then stirred for 30 minutes, and filtered to give a water-white solution containing calcium chloride and ethanolamine. The insoluble matter was washed with water.

The filtrate obtained was reacted with a solution containing one mole of ethanolamine and 0.5 moles of carbon dioxide, forming 0.5 mole of ethanolamine carbonate, which had been diluted with water so that the solution contained 1 mole of ethanolamine carbonate to 18 moles of water. The solution was mixed with the above filtrate and the resultant precipitate obtained was filtered and washed to give a product of precipitated calcium carbonate. The filtrate obtained was recycled for further preparation of PCC. The PCC that had been obtained had a brightness, measured on a elrepho brightness meter according to the method of TAPPI T646 om-94, of 98.5%.

The above procedure was repeated and the particle size of the PCC obtained was measured.

It was found that the PCC obtained had 94.9% of the particles with a particle size of less than 0.8 microns.

EXAMPLE II

PCC was prepared according to the method of Example I, except that a mixture of one mole ethanolamine, one mole hydrochloric acid and 25 moles of water was used, i.e. the solution was more dilute than used in Example I.

The precipitate of PCC was obtained according to the method of Example I and the particle size of the precipitate was measured.

It was found that 60% of the PCC had a particle size greater than 2 microns with a maximum size of 10 microns.

EXAMPLE III

The procedure of Example I was repeated using different temperatures of the solution from which PCC was precipitated.

It was found that if the temperature of the solution was 5° C., the PCC was in the form of rhombohedral calcite, the most stable form of crystalline calcium carbonate. However, if the temperature of the solution was raised at the time of precipitation to be in the range of 35–55° C., the PCC obtained was an accumulation of crystals formed into spheres which were vaterite, a metastable form of calcium carbonate.

This example shows that it is possible to vary or control the crystalline form of the PCC, by varying or controlling the temperature of the solution from which PCC is obtained.

EXAMPLE IV

The vaterite sample of Example III was treated in water at temperatures of 75 or 100° C., for one hour. The PCC obtained was isolated and examined by electron microscopy.

When the temperature of the solution was 75° C., it was found that rhombohedral calcite was obtained. Rhombohedral calcite is the most stable form of calcium carbonate and vaterite, which is a metastable form, reverts to rhombohedral calcite on heating. When the temperature was 100° C., the bulk of the crystals had been converted to acicular crystals of aragonite with small amounts of rhombohedral calcite.

This examples shows that the crystal form of the PCC may be changed after the precipitated calcium carbonate has been formed.

EXAMPLE V

The procedure of Example I was repeated, except that a slight excess of ethanolamine carbonate, gassed with carbon dioxide to a pH of 9.4, was used. The resulting suspension of PCC was filtered and washed with deionized water at a pH of 7.0. It was found that the washed PCC obtained had a pH of 7.2.

The precipitate obtained was washed again, with deionized water containing a small amount of carbon dioxide, with a pH of 6.5. It was found that the pH of the PCC subsequently obtained, in the form of a slurry, was 6.1.

We claim:

1. A method for the manufacture of precipitated calcium carbonate from impure calcium oxide, comprising:
   (a) admixing said impure calcium oxide with an aqueous solution consisting essentially of a salt of at least one compound selected from the group consisting of organic amines of the formula $RNH_2$ and alkanolamines of the formula $NH_2(R^1OH)$, where R and $R^1$ are alkyl groups of 1–4 carbon atoms, and hydrochloric or nitric acid, said salt being used in at least the stoichiometric amount to dissolve the lime;
   (b) separating the solution so obtained from insoluble matter therein; and
   (c) treating the solution with (i) carbon dioxide or (ii) the carbonate of said amine or alkanolamine of step (a).

2. The method of claim 1 in which the solution is treated, in step (c), with an alkanolamine carbonate.

3. The method of claim 1 in which the solution is treated, in step (c), with an amine carbonate.

4. The method of claim 1 in which the solution is treated, in step (c), with carbon dioxide.

5. The method of claim 1 in which the solution of step (c) is treated with the carbonate of the amine or alkanolamine used in step (a).

6. The method of claim 5 in which the organic amine is ethanolamine.

7. The method of claim 5 in which the organic amine is ethylamine.

* * * * *